No. 611,153. Patented Sept. 20, 1898.
B. F. STRANGE.
STOCK YARD GATE.
(Application filed Apr. 26, 1898.)

(No Model.)

WITNESSES:
Geo. W. Naylor
Geo. J. Hoster

INVENTOR
B. F. Strange
BY
ATTORNEYS.

UNITED STATES PATENT OFFICE.

BENJAMIN FRANKLIN STRANGE, OF CORVALLIS, MONTANA.

STOCK-YARD GATE.

SPECIFICATION forming part of Letters Patent No. 611,153, dated September 20, 1898.

Application filed April 26, 1898. Serial No. 678,867. (No model.)

*To all whom it may concern:*

Be it known that I, BENJAMIN FRANKLIN STRANGE, of Corvallis, in the county of Ravalli and State of Montana, have invented a new and Improved Farm or Stock-Yard Gate, of which the following is a full, clear, and exact description.

The object of the invention is to provide a new and improved farm or stock-yard gate which is simple and durable in construction and arranged to permit of quickly and conveniently opening the gate and keeping it securely locked against heavy winds or stock and at the same time to hold the gate partly raised and locked in this position whenever it is desired to separate small from large stock.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1:
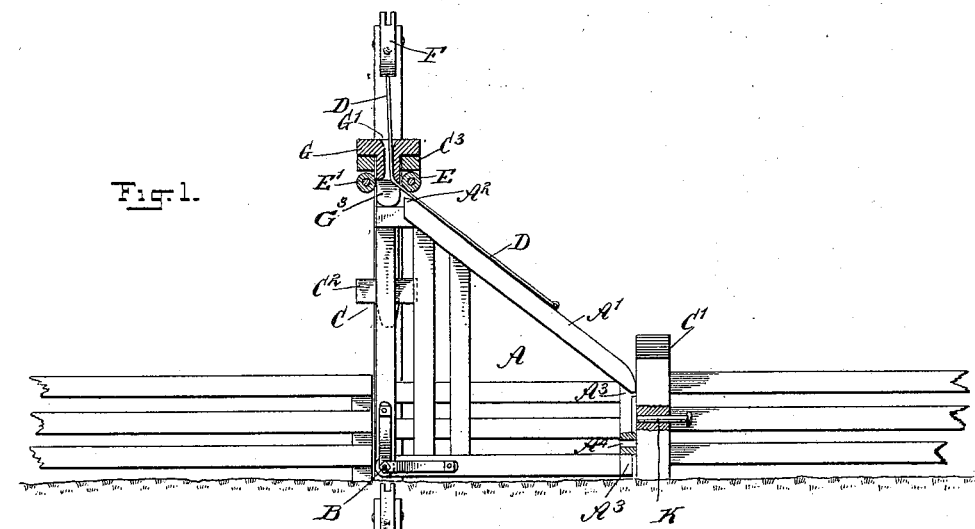
Figure 2:
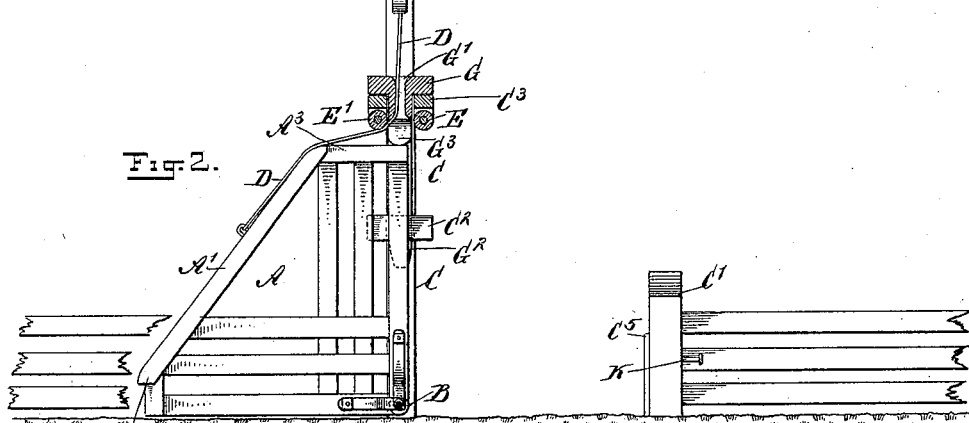

Figure 1 is a side elevation of the improvement in a closed position and with parts in section. Fig. 2 is a similar view of the same in an open position, and Fig. 3 is a transverse section of the same.

Figure 3:
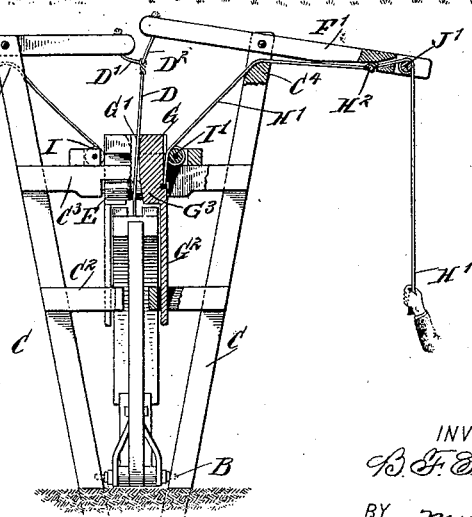

The improved farm or stock-yard gate is provided with a gate A proper, connected at one lower corner by a transverse pivot B with the lower portion of a gate-post C, preferably made in the form of two uprights, as is plainly shown in Fig. 3, between which the gate can swing into an open or closed position, as shown in Figs. 1 and 2, the inner end of the gate fitting closely upon the other gate-post C' when in a closed position, as will be readily understood by reference to Fig. 1. The two uprights of the post C are provided with mortised cross-bars $C^2$, extending toward each other, with sufficient space between their adjacent ends for the gate to swing through, and the said uprights are connected with each other near their upper ends by a mortised cross-bar $C^3$.

The top bar A' of the gate A is arranged in an inclined position, and to it is fastened one end of a rope D, extending upwardly over the top bar to pass under a pulley E or E', journaled in suitable bearings on the cross-bar $C^3$, connecting the two standards of the post C with each other, under which cross-bar swings the uppermost portion of the gate A when moving from a closed into an open position or back from an open into a closed position.

The rope D is provided at its upper end with branch ropes D' $D^2$, connected with the inner ends of levers F F', respectively fulcrumed at the upper ends of the standards for the post C. The rope D after leaving either pulley E or E' passes loosely through a bearing G', formed on a latch G, fitted to slide on the mortised cross-bar $C^3$ and normally resting thereon. The latch G is provided with a rounded head $G^3$, adapted to abut against a shoulder $A^2$, formed at the upper end of the gate A, so as to hold the same against accidental opening. The latch G is further provided with downwardly-extending side arms $G^2$, fitted to slide in bearings on the mortised cross-bars $C^2$, and the said latch is connected at opposite sides with ropes H H', extending upwardly over pulleys I I', respectively journaled in suitable bearings on the top of the cross-bar $C^3$. The ropes H H' then extend upward and pass over bearings $C^4$, arranged on the standards of the post C directly below the fulcrums for the levers F F', and the said ropes then extend under the levers and over the pulleys J J', carried by the outer ends of the levers, to then hang downwardly, so as to be within convenient reach of the operator. As the levers F F' extend transversely to the gate A, it is evident that the downwardly-hanging ends of the ropes H H' depend from the ends of the levers into the roadway a suitable distance from the gate, so that the operator before reaching the gate can readily pull either of the said ropes to impart an upward sliding motion to the latch G, so as to raise the rounded head thereof out of the path of the shoulder $A^2$ and unlock the gate, and a further pull on the rope H or H' causes a swinging motion to be given to the corresponding lever F or F', so that the rope D moves upwardly, and in doing so pulls on the gate A to swing the same on its pivot B until the gate has passed a central position, when it will swing downward by its own weight to a final open position, the latch G being supported on the cross-bar $C^3$, the head $G^3$ being close to the free end A³ of the gate, without, however, locking the gate, which is not necessary when the gate is in an open position. When the operator passes through the gate and desires to close the same, he pulls on the other rope H' or H, so that the above-described operation is repeated—that is, the pull exerted by the rope D on the gate causes the gate to swing back into a closed position.

It is evident from the foregoing that when the operator pulls on either of the ropes H or H' the latch G is first unlocked before the corresponding lever F or F' comes into action for imparting a swinging motion to the gate A. The several parts are so proportioned as to balance each other as near as possible, so that it requires but a light pull on the part of the operator on the rope H or H' to open or close the gate in the manner described.

When it is desired to separate small from large stock, for instance, then the gate A can be swung upwardly into a partly-open position and locked in this position by a bolt K, held to slide longitudinally on the post C' and adapted to engage a bearing A⁴ in the free end A³ of the gate. (See Fig. 1.) The post C' is preferably provided with the usual vertical guideways C⁵, into which the free end A³ of the gate fits when in a closed position to prevent lateral movement of the gate.

It is understood that after the operator has given a good pull on either of the ropes H or H' when opening the gate he then releases the rope, so as to allow the levers, as well as the latch, to drop back by their own weight to their normal position. Instead of ropes, chains or cables may be employed.

Having thus fully described my invention, I claim as new and desire to secure by Letters Patent—

1. A farm or stock gate, comprising a gate proper, a transverse pivot for one lower corner of said gate, to permit the latter to swing in a transverse direction relatively to the gateway, a latch mounted to slide, and adapted to engage a shoulder at the upper end of the gate above said pivot, ropes connected with said latch, a rope connected with said gate, levers connected by branch ropes with said gate-rope, and rollers carried on the outer ends of said levers and engaged by the said latch-ropes for lifting the said latch prior to actuating the levers, substantially as shown and described.

2. A farm or stock gate, comprising a post formed by uprights and mortised cross-bars, a gate proper having one lower corner hung on a transverse pivot carried by the said post, to permit the gate to swing in a transverse direction relative to the gateway, a latch mounted to slide vertically on the said cross-bars and normally supported thereby, the latch being adapted to engage a shoulder at the upper end of the gate above the said pivot, a rope for manipulating the said latch, and a lever mechanism for operating the gate and controlled by the said rope after the latch has been lifted out of engagement with the gate, substantially as shown and described.

BENJAMIN FRANKLIN STRANGE.

Witnesses:
WILLIAM C. WAN,
MIKEL L. KELLEY.